March 10, 1970  W. C. UPDEGRAVE  3,499,543
CRANE

Filed Nov. 13, 1967  6 Sheets-Sheet 1

INVENTOR
WALTER C. UPDEGRAVE
BY *Richard O. Church*
ATTORNEY

INVENTOR
WALTER C. UPDEGRAVE
BY Richard O. Church
ATTORNEY.

March 10, 1970   W. C. UPDEGRAVE   3,499,543

CRANE

Filed Nov. 13, 1967   6 Sheets-Sheet 3

INVENTOR
WALTER C. UPDEGRAVE
BY Richard O. Church
ATTORNEY

March 10, 1970     W. C. UPDEGRAVE     3,499,543

CRANE

Filed Nov. 13, 1967     6 Sheets-Sheet 4

INVENTOR
WALTER C. UPDEGRAVE
BY
ATTORNEY

INVENTOR
WALTER C. UPDEGRAVE
BY Richard O. Church
ATTORNEY

FIG. 12

INVENTOR
WALTER C. UPDEGRAVE
BY Richard P. Church
ATTORNEY

3,499,543
CRANE
Walter C. Updegrave, 300 Adams St.,
Reading, Pa. 19606
Continuation-in-part of application Ser. No. 498,870,
Oct. 20, 1965. This application Nov. 13, 1967, Ser.
No. 684,895
Int. Cl. B66c 23/84; F15b 15/26; F16d 67/00, 23/00
U.S. Cl. 212—66                                    18 Claims

ABSTRACT OF THE DISCLOSURE

A slewing system for mobile type cranes is provided that utilizes efficient, as opposed to self-locking, gearing. To secure the slewing mechanism at any selected position, a hydraulic brake system is provided that is responsive to the pressure in the hydraulic motor ports. This mechanism causes the brake to be released when the motor is being driven and for the brake to set when the motor is not being driven. By properly adusting the hydraulic system, the braking force may be varied between the fully set and the fully released positions to enable precise control over the rotation of the boom. A further modification of this invention permits control of the motor and braking mechanism from more than one location.

---

This application is a continuation-in-part of my copending application Ser. No. 498,870, filed Oct. 20, 1965.

This invention relates to mobile cranes and derricks of the type that commonly are attached to the chassis of a truck. More particularly, the invention is concerned with improved methods and means for slewing these cranes about a vertical axis.

Mobile cranes of the sort with which this invention is concerned may be used, for example, in hoisting various articles, setting utility poles, stringing cable and wire; if they are provided with a ground auger, they may be used for drilling post holes; and if they are provided with a platform or bucket, they may be used to hoist a worker to an elevated position to inspect electrical lines, to install or repair pole line hardware, to service street lights and electrical signs, to prune trees, etc., etc. They have even been provided with water nozzles mounted at the end of the boom for use in fighting small fires. Due to the great versatility of these mobile cranes, their utilization by various organizations such as utility companies is becoming increasingly significant.

A hydraulic drive is usually provided to slew these cranes about a vertical axis. This drive system will include a source for high pressure hydraulic fluid, a rotary hydraulic motor, and suitable gearing to link the output of the hydraulic motor to the pedestal upon which the crane is mounted for rotation. It is conventional to design this gearing in such a manner that it will be self-locking when the hydraulic motor is not in operation. It can be appreciated that this self-locking feature will not only be helpful in bringing the slewing mechanism to rest, but also, it is quite necessary when the crane is used on uneven terrain and the pedestal becomes inclined to the horizontal plane. In this situation, gravity forces could cause the crane to slew "down hill" after the hydraulic motor is stopped, were it not for the self-locking feature of the gears.

It is relatively simple to make these gears self-locking simply by providing an inefficient gear train having an efficiency of less than 50% at static conditions. This may be accomplished by using a gear train comprised of a spur and worm gear combination, two stages of worm gears, helical gears, combinations thereof, and the like. As an efficiency of less than 50% under static conditions is obtained simply by making the lead angle of the gear sufficiently low, the self-locking operation of the crane is assured.

The self-locking feature of the gear trains associated with the slewing mechanisms of cranes is not without certain disadvantages. For example, when the crane is being operated with its pedestal inclined to the horizontal, the slewing mechanism will operate smoothly during that portion of the arc through which its rotation causes the end of the boom to move upwardly with respect to a horizontal plane; however, when the end of the boom passes top dead-center and starts to move downwardly, considerable difficulty in the form of an alternate stop-start oscillatory motion is encountered. This oscillatory motion is a direct result of the self-locking feature of the drive gears. It can be understood that as the end of the boom is moving uphill during rotation, a substantially uniform fluid pressure will drive the motor at a uniform speed. However, as the end of the boom passes top dead-center, the gravitational forces acting on the boom will reduce the rotational torque required to rotate the boom. Initially, this will cause the boom to rotate faster than it was rotating when moving uphill, and the operator, to maintain a uniform speed of rotation, will generally throttle back on the hydraulic controls. Nonetheless, the torque of the gravity forces will cause the boom to move ahead of the motor to the extent that the clearance in the drive gears permits. This will close up the backlash space in the drive gears and reverse the load to the opposite faces of the gear teeth. Since the gears by design are self-locking, the drive force or torque of the motor will be opposed, particularly since the hydraulic fluid usually has been throttled back by the operator, and the motor will temporarily stall until the hydraulic pressure increases to that extent necessary to unlock the gears. At this point, the backlash spaces will reverse and the forces will be transferred to the original faces of the gear teeth. This action will be accompanied by a sudden start in rotation of the slewing mechanism. Immediately thereafter, another reversal of the backlash space will take place as the boom overruns the motor, the gears will lock and the rotation will stop, and then, once again, the buildup of hydraulic pressure will unlock the gears and the boom will jerk ahead. From the foregoing, it can be seen that the repeated reversal of the forces applied to the faces of the gear teeth within the backlash space will interfere with precise control over the rotation of the boom, and also may become a safety hazard to the operator.

Other hazards are sometimes attendant with the use of self-locking gears associated with mobile cranes. For example, mobile cranes can be used to string electrical cable. In this application, the boom is rotated to one side of the truck and cable is paid out over the end of the boom as the truck is driven along. Should the cable become fouled and an overload develop, the torque acting through the boom may damage the mechanism or upset the truck. Similar accidents will occur if the boom is inadvertently driven against an obstruction such as a tree or pole. These hazards are particularly great if an operator is riding on a platform or in a bucket at the end of the boom, as may occur when inspecting continuous lengths of power transmission lines.

Accordingly, it is an object of this invention to provide a slewing mechanism for mobile cranes and the like that will operate smoothly even when being used on an inclined plane.

Another object of this invention is to provide a slewing mechanism for cranes that will run substantially at constant speeds, both "uphill" and "downhill," even when the mechanism is located on an inclined plane.

A further object of this invention is to provide an improved braking system for slewing mechanisms that will slip if momentary overloads or obstructions are encountered.

Yet a further object of this invention is to provide a slewing mechanism for mobile cranes that will operate smoothly, essentially at uniform speed, and be controllable with precision by the operator.

Still a further object of this invention is to provide an improved slewing system that may be operated from any of several locations.

Briefly, these and other objects of this invention are achieved by providing in combination an efficient gear train in the slewing mechanism that is not self-locking and a braking mechanism that is responsive to the hydraulic fluid pressure at the motor ports. This brake is adjusted so that when full hydraulic pressure is being supplied to the hydraulic motor, the brake will be completely released. As the hydraulic fluid pressure is reduced, as when slowing down the motor, the brake gradually will be applied and finally become fully set when the supply of high pressure hydraulic fluid to the motor is discontinued. Further, by providing appropriate shuttle valves, the motor and brake arrangement can be controlled from several locations as at ground level and at the end of the boom where a bucket may be located.

By these means, the following advantages accrue:

(1) Oscillations in the slewing mechanism will be avoided when the boom is traveling "downhill."

(2) The brake mechanism will be partially engaged when the hydraulic motor is under comparatively low loads, such as when the boom is traveling "downhill," and the brake will be fully released under conditions of maximum motor torque, as when the boom is moving "uphill," thus providing speed control over the rotation of the boom to stabilize the rotation whether the boom is going "uphill" or "downhill."

(3) The boom will be locked in position at all times when the hydraulic motor is not being rotated or, in emergencies, when there is a failure in the hydraulic system.

(4) As the braking mechanism can be adjusted to slip when certain momentary overload torque conditions develop, as when an obstruction is encountered, the boom will rotate to a safe position, thus preventing damage to the mechanism and possible upset of the crane.

The efficient gearing necessary in the practice of this invention is readily provided by utilizing all spur gears in the drive train, or by utilizing spur gears, bevel gears, worm gears, hypoid gears, and combinations thereof and their equivalents, provided only that the lead angle on the worm or helical gears is sufficiently high to provide efficient operation. As previously noted, this efficiency, at rest, must be greater than 50% to avoid self-locking operation. If all spur gears are utilized in the drive train, it is possible to achieve efficiencies as high as 98%. While the invention will hereinafter be described with specific regard to gear trains comprised of spur gears, it is to be understood that it is within the scope of this invention to utilize other types of gears such as mentioned above, provided only that the mechanical efficiency of the gear train is sufficiently high to avoid any self-locking action.

The invention will be more readily understood with respect to the accompanying drawings in which.

Figure 1:
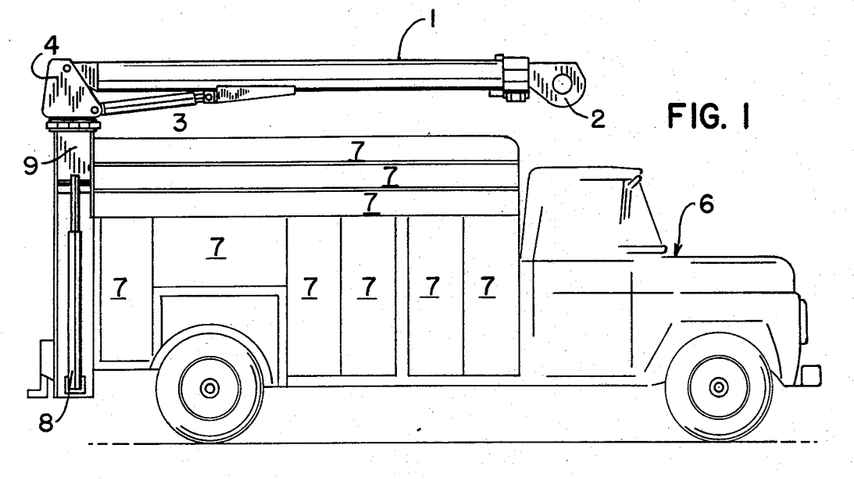
FIGURE 1 is a generalized view in side elevation of a mobile crane of the sort with which this invention is concerned.

Referring to FIGURE 1, there is generally illustrated a utility truck 6 having a crane mounted thereon. The utility truck 6 is shown with a series of storage compartments 7 positioned along the sides and a boom structure mounted adjacent the rear corner. It is to be understood that the boom structure can be mounted at any convenient location on the truck, depending upon the type of body and the location of the storage compartment. An outrigger brace 8 is provided to pivot away from the side of the truck and give it stability when the crane is in operation.

The crane itself is comprised of a boom 1 to which is attached an operating head 2 that may be attached by means of a suitable fixture to any desired equipment such as pole handling equipment, augers, aerial platforms and the like. The boom 1 is pivotally mounted at its one end in a bracket 4. Operation of hydraulic cylinder 3 will cause the boom 1 to be raised and lowered about the horizontal axis. The slewing mechanism, including the hydraulic motor and the braking device of this invention, are contained within a housing 9. This slewing mechanism 9 is operative to cause the bracket 4 and the boom 1 to rotate about a vertical axis.

Figure 2:
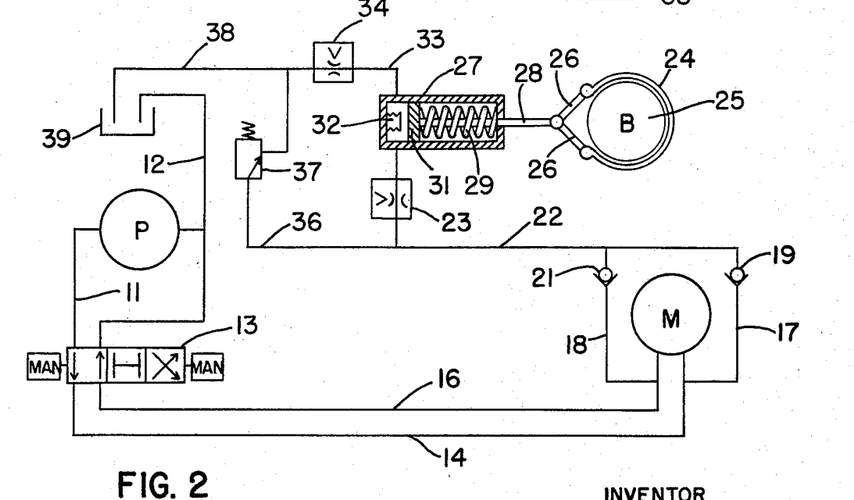
FIGURE 2 is a schematic representation of the control features of this invention.

Referring to FIGURE 2, there is illustrated in schematic form the principles of this invention. Herein a hydraulic motor M is provided to drive the slewing mechanism (not shown). The motor M may be driven in either direction by means of high pressure hydraulic fluid supplied by a hydraulic pump P which in turn is powered by a suitable device such as a gasoline engine (not shown). The pump P receives a supply of hydraulic fluid from storage sump 39 via conduit 12 and discharges high pressure fluid via conduit 11 to spring centered spool valve 13 which has three operational positions. In the first of these positions, high pressure hydraulic fluid conduit 11 is aligned with motor conduit 14 and low pressure conduit 12 is aligned with motor conduit 16. In the second or middle position, provided for idling when the motor is not being driven, hydraulic fluid is continuously recirculated from high pressure conduit 11 to low pressure conduit 12. Also, while the spool is in this middle position, conduits 14 and 16 are interconnected with themselves and each may freely discharge hydraulic fluid into low pressure conduit 12 to avoid the buildup of pressure within the motor conduits 14 and 16. When the spool valve body is moved into the third position, high pressure hydraulic fluid conduit 11 is aligned with motor conduit 16 and low pressure conduit 12 is aligned with motor conduit 14. By these means, the motor M selectively may be driven in either direction or allowed to assume a stationary position without discontinuing the operation of pump P.

A brake B is provided that is functionally associated with the slewing mechanism (not shown). The brake is comprised of a brake drum 25, a brake band 24, and operating linkages 26. The operation of the brake is controlled by the position of connecting rod 28 that, when moved in an axial direction, will actuate the linkages 26 and cause the brake band 24 either to be drawn into frictional engagement with brake drum 25 or to be released from such frictional engagement.

The connecting rod 28 is attached to a piston 31 located within a hydraulic cylinder 27. A spring 29 biases the piston 31 to cause the connecting rod 28 to move to the left, as shown in the drawing, and keep the brake band 24 in normal frictional engagement with the brake drum 25. The brake B may be released, however, by introducing hydraulic fluid under pressure into cylinder 27 sufficient to move the piston 31 and connecting rod 28 to the right against the bias of spring 29.

Cylinder 27 is in hydraulic communication with conduit 22 by way of a valve 23 that has an orifice, preferably of the variable type. Conduit 22, in turn, is in hydraulic communication with motor conduit 14 by way of conduit 17 and check valve 19, and also communicates with motor conduit 16 by way of conduit 18 and check valve 21.

Conduit 33 is provided to discharge hydraulic fluid from cylinder 27 via a metering valve 34 into conduit 38 where oil is returned to the hydraulic sump 39. A pressure relief valve 37 is provided in conduit 36 that communicates between high pressure conduit 22 and return conduit 38 that, when in the relief position, will allow high pressure hydraulic fluid to bypass hydraulic cylinder 27 as well as motor M. While this relief valve 37 is not essential in the operation of this invention, it is generally advantageous to provide a hydraulic relief in the system as protection should the pressure output of the pump P exceed the pressure rating of either the motor M or the brake cylinder 27. By providing the relief valve 37 at the point in the system as here shown, all elements of the slewing mechanism can conveniently be protected.

From the above, it can be understood that whenever high pressure hydraulic fluid is supplied to the motor M to drive it in either direction, either check valve 19 or 21 will be lifted off its seat and the interior of cylinder 27 will be subjected to hydraulic pressure in an amount proportioned by the setting of metering valves 23 and 34. Accordingly, when the motor is driven in either direction, high pressure hydraulic fluid will unseat either check valve 19 or 21, actuate piston 31 and its connecting rod 28 to move against the bias of spring 29 and cause the brake band 24 to disengage, at least in part from the brake drum 25, thus releasing the brake B. This, of course, will allow the slewing mechanism to rotate. Conversely, when the spool valve 13 is moved to its middle position and the flow of hydraulic fluid to motor M is discontinued, oil pressure in cylinder 27 will be relieved through valve 34, the bias of spring 29 will move piston 31 and its connecting rod 28 to the left, the brake band 24 will engage brake drum 25 and the brake B will lock the associated slewing mechanism in position.

It is a further provision of this invention that if the hydraulic pressure in either line 14 or 16 is reduced below full operating pressures, the brake band 24 will engage the brake drum 25 to a varying degree. Precise control over the action of the brake B, that is, the pressure at which it is actuated and the extent to which it is actuated, is obtained by properly adjusting metering valves 23 and 34 and the bias of spring 29.

Provision for this partial braking performs several important functions. First, it enables more precise control over the rotation and positioning of the slewing mechanism. When the operator throttles down on spool valve 13, the brake B will begin to engage and help to cause a smooth but positive deceleration of the slewing mechanism and boom. Second, if the pedestal upon which the slewing mechanism is mounted is inclined to a horizontal plane, as when used on uneven terrain, the weight of the slewing mechanism and boom will tend to drive motor M and cause it to overspeed when the boom passes top center and begins to travel "downhill." When this occurs, the pressure in the high pressure hydraulic conduit will diminish and enable the brake band 24 partially to engage brake drum 25 and reduce the speed of the slewing mechanism as it tends to overspeed. Conversely, when the boom is being rotated "uphill," the hydraulic pressure will be at a maximum, the brake will be completely released, and full operating efficiency and torque will be made available. By these means, when metering valves 23 and 34 and spring 29 are properly adjusted, a substantially uniform speed of the slewing mechanism is provided for whether the boom is being rotated "uphill" or "downhill." Third, this control over the braking system acts as a safety feature to release the brake B and allow the boom to rotate if a force of such magnitude is applied to the boom as would otherwise damage or upset the entire mechanism. For example, cranes of the sort with which this invention is concerned are generally mounted on a mobile truck such as shown in FIGURE 1. For some applications, the truck is driven down a roadway with the boom extending over the side of the truck chassis. This is done, for example, when the crane is used to string cable or is supplied with a bucket to allow an operator to inspect a continuous length of elevated wire or cable. If an overload develops, or if an obstruction such as a tree or a pole is contacted, the brake will slip and allow the slewing mechanism to rotate to a safe position, thus preventing injury to the operator or damage to the crane.

By adjusting the mechanical advantage of the mechanism and the bias of spring 29, the torque at which the brake B will slip can be controlled. Advantageously, the spring adjustment may be calibrated so that the operator can adjust the spring to release at any selected torque depending upon the conditions of intended use.

Response of the brake to changes in pressure in hydraulic line 22 may be controlled, as mentioned above, in several different manners. First, a metering valve 23 with a fixed or adjustable orifice enables control over the pressure of the hydraulic fluid acting within cylinder 27. Second, metering valve 34 with a fixed or adjustable orifice enables control over the rate with which the hydraulic fluid is discharged to the sump 39. It is to be understood that when the piston 31 is being acted upon by hydraulic fluid, hydraulic fluid is continuously discharged to the sump via conduits 33 and 38. Third, control of the operation of the brake B is obtained by selecting the proper cross sectional area of the piston 31. Fourth, the bias of spring 29 will give control over the operation of the brake. As mentioned above, in the preferred practice of this invention, calibrated adjustment means are provided to alter the bias of spring 29 as desired. Last, a further feature of this invention, which sometimes may be useful but is not essential, is a provision for an accumulator 32 or similar yieldable device within cylinder 27. By so including an accumulator within the system, the changes in pressure within cylinder 27 will be modulated, at least in part, to avoid oscillation of the connecting rod 28 or an undesirable rapid action of the brake B.

Figure 10:
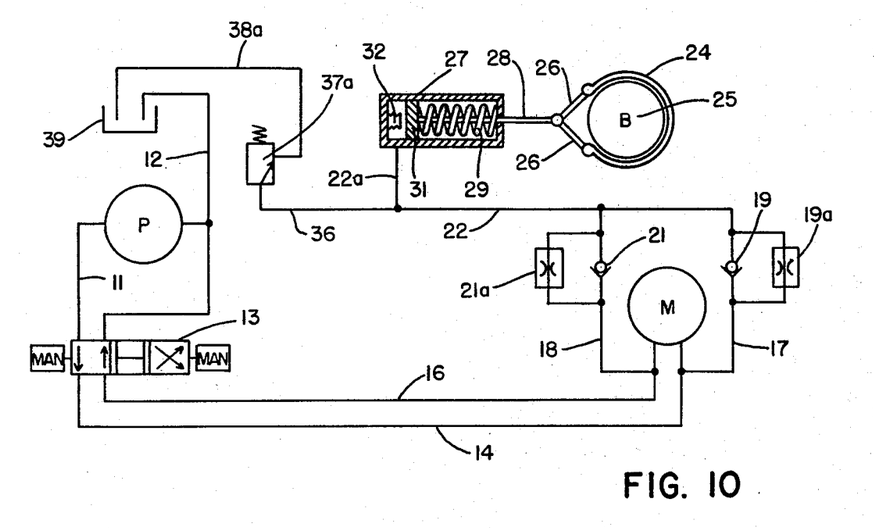
FIGURE 10 is a schematic representation showing another alternative of brake control means designed in accordance with this invention.

FIGURE 10 is a schematic representation of this invention which is functionally similar to that shown in FIGURE 2, but which contains an alternative embodiment of the valve structure for controlling reaction of the brake to hydraulic pressure in the system. In this embodiment, metering valves 21a and 19a are placed in parallel relationship with each of the ball check valves 21 and 19 respectively in the hydraulic lines 18 and 17. The metering valves 23 and 34 of FIGURE 2 are eliminated, and relief of hydraulic pressure from the brake cylinder 27 is provided through the metering valves 19a and 21a. The pressure relief valve 37a is functionally associated with the hydraulic line 22 and the sump 39 via the hydraulic lines 36 and 38a respectively.

In operation, when, for example, the motor conduit 16 is selectively energized with high pressure hydraulic fluid directed to the motor M, the high pressure hydraulic fluid will also be directed through conduit 18, unseating the ball check valve 21, and will pass through the hydraulic lines 22 and 22a into the brake cylinder 27 releasing the brake B in the manner described above. At the same time, hydraulic fluid pressure in line 22 will be relieved, in part, by passage through the metering valve 19a. The hydraulic fluid passing through the metering valve 19a will be returned through the low pressure circuit in line 17 and motor conduit 14. While hydraulic fluid will constantly flow through the metering valve 19a, the pressure drop through this orifice will provide for a constant hydraulic pressure within the brake cylinder 27 to keep the brake disengaged. When the motor spool 13 is returned to its mid position, hydraulic fluid will immediately dump through both metering valves 19a and 21a and permit the brake B to set.

Similarly, when the motor conduit 14 is selectively energized, the high pressure hydraulic fluid will flow through the conduit to the motor and will, at the same time, enter the hydraulic line 17, unseat the ball check valve 19 and flow into the brake cylinder via the conduit 22, causing the brake B to be released. When the motor is being operated in this direction, the constant bleed will be through the metering valve 21a to the low pressure conduits 18 and 16.

It will be seen that this system provides for more rapid reaction of the brake mechanism to fluctuations in hydraulic drive pressure since the brake cylinder will receive a substantially unthrottled flow of hydraulic pressure from the motor conduits 14 or 16 because of the free flow of hydraulic fluid through the ball check valves 19 and 21. Conversely, when the hydraulic pressure in motor conduits 14 or 16 is relieved, the brake will set more quickly since both metering valves 19a and 21a will provide passageways to return the hydraulic fluid in the brake cylinder to the sump.

The degree of sensitivity of the brake mechanism to the pressure in the motor conduits 14 and 16 may be regulated by adjusting the orifices of the metering valves 19a and 21a, because an increase in the restriction in either metering valve will reduce the hydraulic flow past that point back to the low pressure circuit, and thus the brake B will set more rapidly in response to pressure in the motor conduits since the total hydraulic pressure effective at the brake cylinder 27 will be increased as a restriction at the metering valve 19a or 21a is increased.

Figure 9:
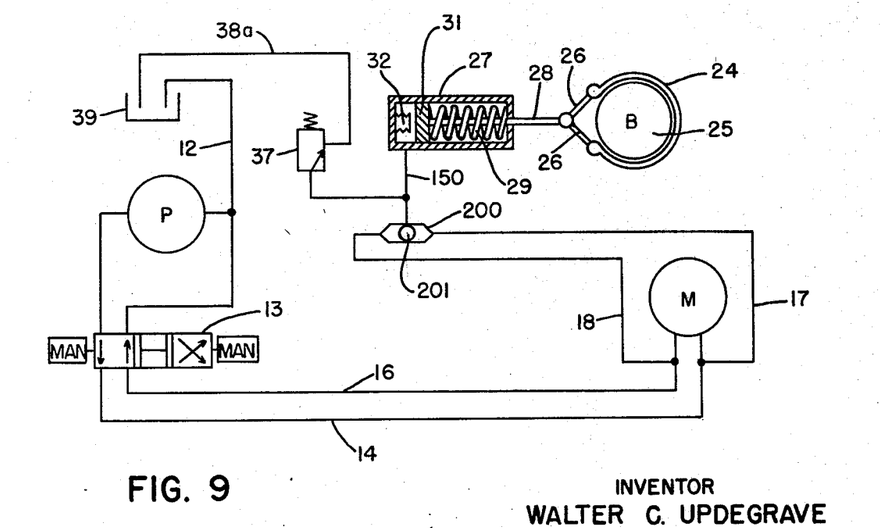
FIGURE 9 is a schematic representation of the control features of this invention, including certain features and variations not shown in FIGURES 2 and 3.

FIGURE 9 is a schematic representation of another embodiment of this invention, in which the means for regulating the flow of hydraulic fluid to and from the brake cylinder 27 comprises a ball shuttle valve 200. The shuttle valve 200 communicates at either end of the valve body with the motor conduits 14 and 16 via the hydraulic lines 17 and 18 respectively, and with the brake cylinder 27 via the hydraulic line 150 at the mid point of the valve body 200. The pressure relief valve 37 is operatively connected to the brake cylinder conduit 150 and provides hydraulic pressure relief to the sump 39 via the line 38a when pressure in the brake system becomes excessive. In all other respects, the slewing mechanism of FIGURE 9 is essentially similar to that illustrated in FIGURE 2, described above.

In operation, when the control valve 13 is in the illustrated position, high pressure hydraulic fluid will flow through the motor conduit 14 to the motor and into hydraulic line 17 and to the shuttle valve 200. Since the pressure in the hydraulic line 18 will be lower than that of line 17, the ball 201 will be shifted leftward by the pressure entering the valve chamber 200 from hydraulic line 17. When the ball 201 seats on the orifice of the hydraulic line 18, the exhaust of hydraulic fluid through line 18 is prevented and the full flow of hydraulic pressure originating from hydraulic line 17 will be directed through the conduit 150 and into the brake cylinder 27, resulting in release of the brake in the manner described above, concurrent with the rotational action of the motor M.

The ball shuttle valve 200 also facilitates safe operation of the slewing mechanism in situations where the crane is used on an incline and the boom, after reaching top center, begins to rotate downhill and overspeed. If, for example, the high pressure drive line in the uphill rotation is the hydraulic conduit 14, the ball 201 of the shuttle valve 200 will be seated to the leftward position, as described above. After the boom reaches dead center and begins to overspeed the motor, there will be an increase in pressure output through the hydraulic line 18 which will tend to unseat the ball 201 and permit a reduction in hydraulic pressure in the brake cylinder 27 as hydraulic fluid exhausts through the valve 200 via the hydraulic line 17, which has become a low pressure line. Thus, the piston 31 will travel somewhat to the left, causing a partial setting of the brake and a slowing of the rotational speed of the boom.

Figure 3:
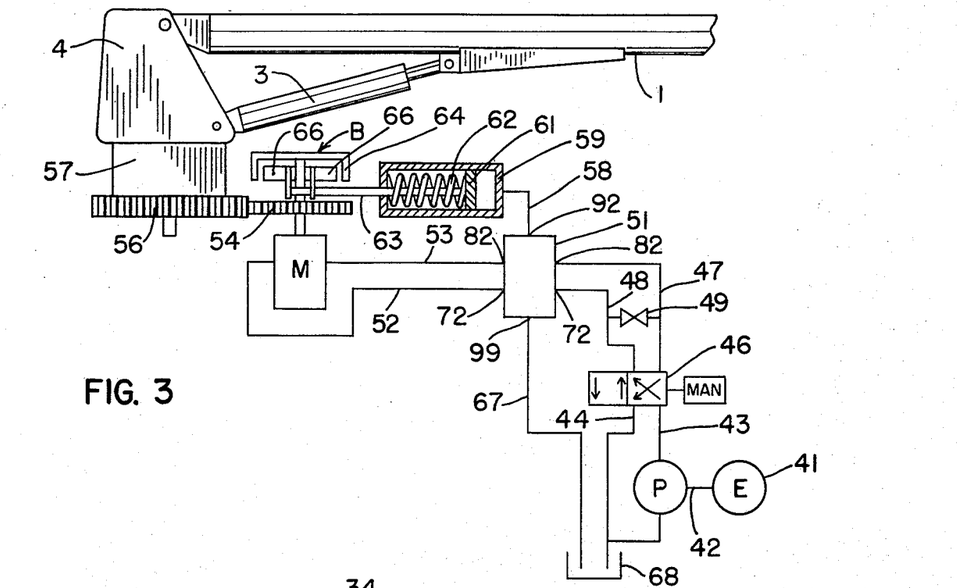
FIGURE 3 is another schematic representation of the control features of this invention, including certain features and variations not shown in FIGURE 2.

In FIGURE 3, there is presented another schematic illustration of this invention which is functionally similar to that shown in FIGURE 2, but showing slightly different details. As in FIGURE 2, a motor M is provided to drive the slewing mechanism and receives high pressure hydraulic fluid from pump P powered by engine 41 and shaft 42. The motor M is connected to a pinion gear 54 which engages bull gear 56. As illustrated in the drawing, the boom is mounted on a pedestal 57 that is associated with bull gear 56. The shaft from the motor M passes through pinion gear 54 and is attached at its upper end to a bell shaped brake drum 64. Internal of the brake drum 64 are one or more brake shoes 66 that are actuated by suitable linkages with connecting rod 63 and piston 61. The piston 61 is biased by means of spring 62 to maintain the brake shoes 66 normally in frictional engagement with brake drum 64. If high pressure hydraulic fluid is introduced into cylinder 59, however, it will cause the piston 61 to move against the bias of spring 62, thus moving the connecting rod 63 and associated linkages to cause the brake band 66 to be moved out of frictional engagement with the brake drum 64.

The operation of the device shown in FIGURE 3 is similar to that of FIGURE 2. The hydraulic pump P supplies high pressure oil via conduit 43 to spool valve body 46. Depending upon the position of spool valve 46, high pressure oil either flows into motor conduit 47 and is discharged via motor conduit 48 or high pressure oil is introduced into motor conduit 48 and is discharged via motor conduit 47. In either instance, the discharge fluid leaves the valve body 46 via low pressure conduit 44 and is returned to hydraulic fluid storage sump 68. Unlike the spool valve 13 shown in FIGURE 2, the spool valve 46 of FIGURE 3 has only two positions. Control of the rotation of the slewing mechanism is here obtained by positioning bypass valve 49. When bypass valve 49 is opened, it will allow hydraulic fluid continuously to circulate through conduits 47 and 48 and not actuate motor M. However, when bypass valve 49 is shut, high pressure oil will be supplied to motor M either by way of conduit 47, valve body 51 and conduit 53, or else by means of conduit 48, valve body 51 and conduit 52, depending upon the intended direction of rotation of the slewing mechanism and the position of the spool in valve body 46.

As discussed with respect to FIGURE 2, when high pressure hydraulic fluid is supplied to motor M, hydraulic fluid is also supplied to cylinder 59 to release the brake B. This is accomplished by the design of valve body 51. The design and operation of the valve body 51 can best be understood by reference to FIGURE 4.

Figure 4:
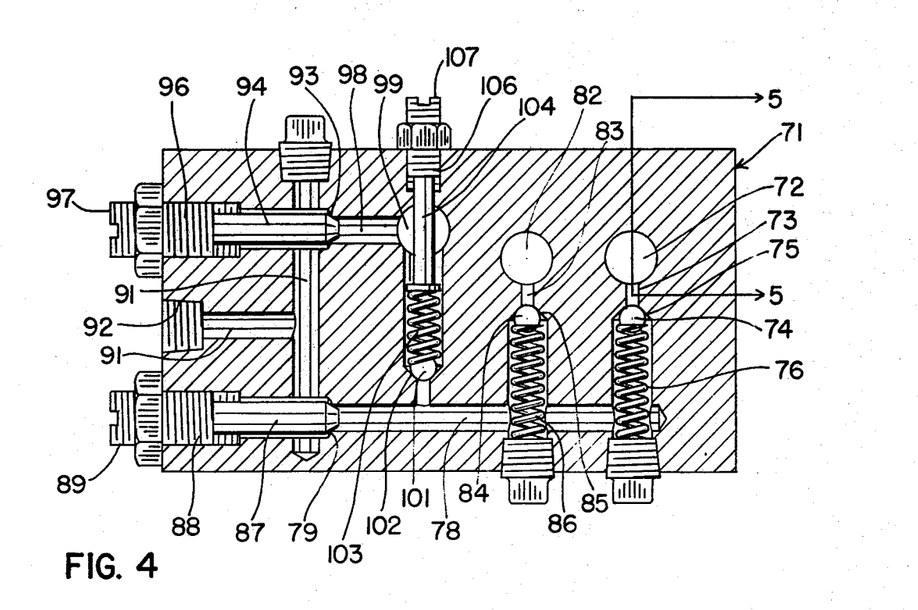
FIGURE 4 is a view, partially in section, showing a valve body especially useful in practicing this invention.
Figure 5:
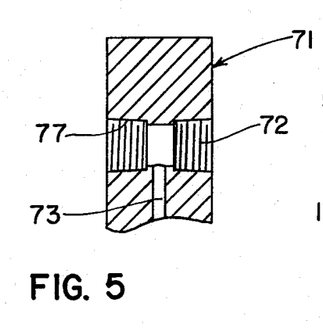
FIGURE 5 is a sectional view taken through line 5—5 of FIGURE 4.

In the valve body 51 illustrated in FIGURE 4, motor ports 72 and 82 pass entirely through the valve block 71. This can best be seen in FIGURE 5 where these motor ports are tapped to receive fittings on both sides. Each of these motor ports is connected on one side to the motor M such as by conduits 52 and 53 shown in FIGURE 3, or by bolting the valve block 51 directly against the motor. The other side of the motor ports 72 and 82 are connected to the source of hydraulic fluid under pressure as via conduits 47 and 48 shown in FIGURE 3. Drilled passageways 73 and 83 communicate at one of their ends with motor ports 72 and 82 respectively, and on their other ends with ball checks 74 and 84 respectively. The ball checks 74 and 84 are held against their seats 75 and 85 by means of springs 76 and 86.

The ball check valves 74 and 84 communicate at their lower end with the drilled passageway 78. Passageway 78, in turn, communicates with passageway 91 via a metering valve 87. This metering needle valve 87 seats as at 79 at the end of passageway 78. The needle valve 87 is connected to the valve body 71 by a threaded connection 88 and may be adjustably moved into and out of contact with seat 79 by rotating head nut 89. Passageway 91 communicates with threaded port 92 which serves as a connection to the hydraulic cylinder 59 via conduit 58 as shown in FIGURE 3.

Passageway 91 also communicates with passageway 98 via a needle valve 94. The needle valve 94 seats as at 93 and, due to the threaded connection 96, the needle valve 94 may be adjustably positioned with respect to seat 93 by rotating head nut 97. Conduit 98 communicates with port 99, which is attached to return conduit 67 as shown in FIGURE 3, to return spent hydraulic fluid to hydraulic sump 68. A bypass relief valve communicates between passageway 78 and return port 99. This bypass relief valve is comprised of a ball check 101 that is held by spring 103 against a seat 102. By means of operating stem 104, threaded as at 106, the bias of spring 103 adjustably can be regulated by rotating operating stem nut 107.

The operation of this valve body 71 readily can be understood in connection with the above description of FIGURES 2 and 3. When the motor M is energized, high pressure hydraulic fluid will enter either port 72 or 82. This will unseat either ball check 74 or 84 and introduce high pressure hydraulic fluid into conduit 78. This high pressure hydraulic fluid in conduit 78 is utilized to release the brake B due to the flow of hydraulic fluid through conduit 91 and the establishment of hydraulic pressure within the brake cylinder 59 via port 92. As needle valves 87 and 94 are essentially pressure reducing devices, their adjustment will regulate the hydraulic pressure within the hydraulic cylinder 59, and accordingly, in connection with piston 61 and spring 62, can be used to control the characteristic response of the brake B.

As mentioned in connection with FIGURE 2, it is generally desirable to protect the hydraulic cylinder 59 and the motor M from excessive hydraulic pressure, and for this reason, the bypass relief valve is provided. By these means, should the hydraulic pressure within passageway 78 exceed a predetermined amount, the ball 101 will lift off its seat 102 and discharge excess oil directly to return port 99.

From the foregoing, it can be appreciated that this simple single valve body is the functional equivalent of check valves 19 and 21, conduits 22, 33 and 36, metering valves 23 and 34, and pressure relief valve 37, all as illustrated in FIGURE 2.

Figure 6:
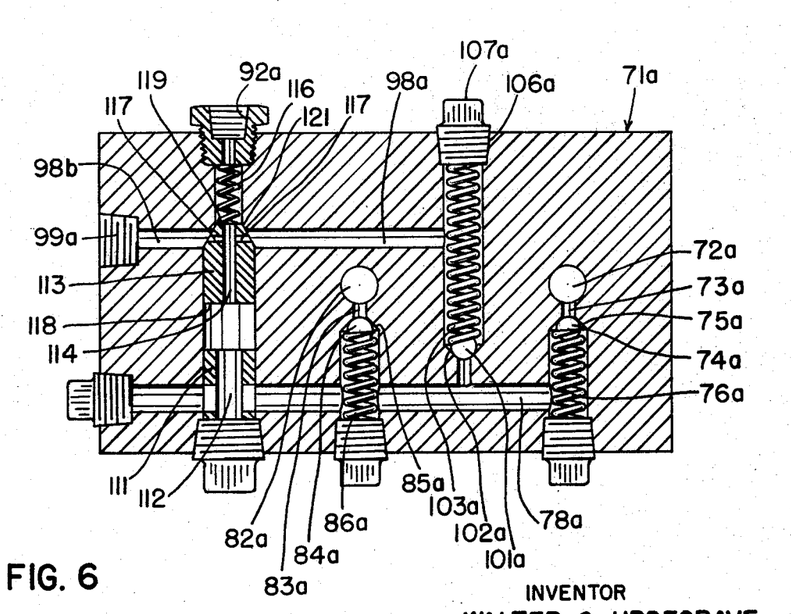
FIGURE 6 is a view, partially in section, showing a valve body of different design useful in practicing this invention.

With reference to FIGURE 6, there is shown another embodiment of a valve body 71a that is suitable for use with this invention and is approximately the functional equivalent of valve body 71 shown in FIGURE 4. For convenience, those elements shown in FIGURE 6 that are similar to the elements of FIGURE 4 are identified with the same numerical designation, but with a suffix a. The valve body 71a is provided with two valve ports 72a and 82a that communicate respectively via drilled passageways 73a and 83a, valve seats 75a and 85a, ball checks 74a and 84a with passageway 78a. Ball checks 74a and 84a are held against their respective seats 75a and 85a by springs 76a and 86a. Passageway 78a communicates by way of shoulder block 111 and its drilled passageway 112 to the underside of valve spool 113. The valve spool 113 is provided with an axial passageway 114 that provides communication between the lower end of the valve spool 113 and the threaded port 92a that, in turn, is in hydraulic communication with hydraulic cylinder 59 via conduit 58 as illustrated in FIGURE 3.

The upper portion of valve spool 113 has a frustroconical shape, the surface of which may be seated in fluid sealing relationship against valve seat 121. The upper face 119 of this valve spool 113 has an area substantially less than the area of its lower face 118. A comparatively light spring 116 biases the valve spool 113 so that when not acted upon by other forces, it will be moved downwardly and away from the valve seat 121. The upper portion of the valve spool 113 is also provided with a plurality of generally radially extending passageways 117. These passageways 117 are positioned within the upper portion of the valve spool 113 so that when the valve is engaged with its seat 121, the drilled passageways 117 will provide communication between the passageway 98a, the spool passageway 114, and the passageway 98b. Passageway 98b has a threaded port 99a that communicates with the hydraulic sump 68 via conduit 67 as shown in FIGURE 3.

Valve body 71a is also provided with a pressure relief valve comprised of a seat 102a, a ball check 101a, a spring 103a and a threaded spring adjusting member 106a that may be regulated by nut 107a. The interior of this pressure relief valve communicates via conduit 98a, drilled passageway 117, conduit 98b, and port 99a to the hydraulic sump 68 via conduit 67.

The operation of the valve shown in FIGURE 6 is as follows. When high pressure hydraulic oil is supplied to the motor via either motor port 72a or 82a, either ball check 73a or ball check 84a, as the case may be, is lifted off of its seat and high pressure hydraulic fluid enters conduit 78a. This high pressure fluid communicates via passageway 112 to the lower face 118 of valve spool 113. Hydraulic fluid immediately passes through passageway 114 to brake port 92a. Hydraulic fluid also will commence flowing through drilled passageways 117. Due to the small diameter of drilled passageway 114, a pressure drop will take place in the hydraulic fluid as it passes through the valve spool 113. This will develop an unbalanced force between the lower face 118 and the upper face 119 of the valve spool 113 and, accordingly, the valve spool 113 will move upwardly into sealing relationship with valve seat 121 in opposition to the bias of spring 116. Once the valve spool 113 has been seated in this position, the high pressure hydraulic fluid will act over the entire lower face 118 of the valve spool 113, but only over the reduced upper face 119 of the valve. This will provide a positive force to maintain the valve spool 113 securely seated against seat 121 as long as high pressure hydraulic fluid is passing either through motor port 72a or 82a. However, when the control valve is moved to a neutral position and the supply of high pressure hydraulic fluid to motor ports 72a and 82a is discontinued, the pressure of the hydraulic fluid surrounding and within the valve spool 113 immediately will be relieved via drilled passageways 117 and passageway 98b. Once this occurs, the hydraulic forces on both the lower 118 and upper 119 faces of the valve spool 113 will be relieved and the spring 116 will cause the valve spool 113 to be moved away from its seat. At this moment, hydraulic fluid contained within the cylinder 59 will flow out of the cylinder via port 92a, conduit 98b, port 99a, and be returned to the sump 68 via conduit 67.

The primary advantage of valve body 71a as shown in FIGURE 6 lies in the fact that immediately upon discontinuation of the supply of high pressure hydraulic fluid to the motor, the valve spool 113 will open wide to present a substantially unrestricted passageway for the discharge of hydraulic fluid from cylinder 59 to the sump. This almost instantaneous "dumping" of the hydraulic fluid from the cylinder 59 will cause the brake B to be set with essentially no time delay. In contrast to this, the valve body of FIGURE 4 may slightly delay this action since, before the brake can be fully set, the fluid within the cylinder 59 must be bled to the sump via the restriction imposed by needle valve 94. Accordingly, the operating characteristics of the valve body shown in FIGURES 4 and 6 will be slightly different, and the selection of the proper one will depend upon the conditions of intended use.

Figure 8:
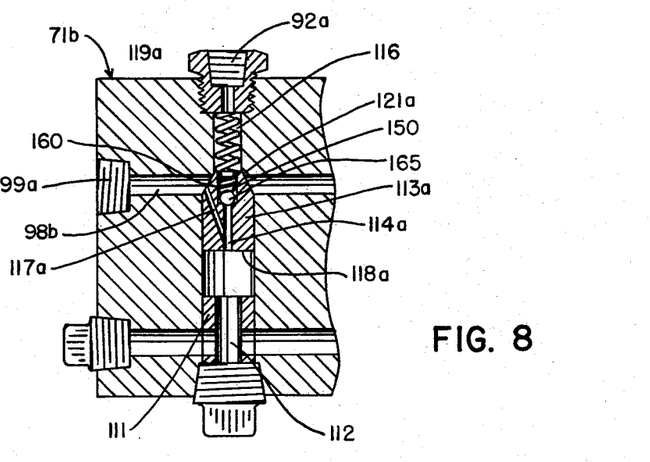
FIGURE 8 is a view, partially in section, showing another valve body useful in practicing this invention.

An alternative embodiment of this valve body 71a is the valve body 71b illustrated in FIGURE 8. The advantage of this valve body 71b is that it will provide an even more rapid discharge of hydraulic fluid from the cylinder 59 to the sump than is provided by the valve body 71a shown in FIGURE 6. Here the valve spool 113a contains a small diameter drilled passageway 114a which communicates to the hydraulic line 116 via the spring biased shuttle valve 160. In its normal position, the ball 165 of the shuttle valve 160 is biased in a downward position by the spring 150. The drilled passageway 117a provides hydranlic communication between the port 99a and the drilled passageway 114a. When high pressure hydraulic fluid is introduced into the passage 112 from either of the motor ports (not shown), the pressure of the hydraulic fluid on the lower face of the valve spool 118a will cause the valve spool 113a to move upward to the seat 121a. At the same time, hydraulic fluid entering the drilled passageway 114a, when it is sufficient to overcome the pressure of the spring 160, will unseat the ball 165 from its sealing relationship on the passageway 114a and hydraulic fluid will enter the channel 116 and exit to the brake via the port 92a. As described above in relation to FIGURE 6, the valve spool 113a will remain seated so long as there is hydraulic pressure acting on the lower face of the valve spool 113a. A constant bleed of hydraulic pressure to the sump is permitted through the drilled passageway 117a. When the pressure on the lower face 118a of the valve spool 113a is reduced as when the control valve is moved to a neutral position and a supply of high pressure hydraulic fluid from the motor ports is discontinued, the pressure of the hydraulic fluid surrounding and within the valve spool 113a immediately will be relieved via the drilled passageway 117a and passageway 98b. At this time, the pressure of the hydraulic fluid from the port 92a acting upon the upper valve spool surface 119a will cause the ball check valve 165 to seat on the passageway 114a, and since the pressure on the upper face 119a is greater than that on the lower face 118a, the valve spool 113a will be shifted downward and a rapid exhaust of hydraulic fluid from the brake cylinder via the port 92a, the channel 98b and the port 99a will take place and the brake will set immediately. It will be seen that the ball check valve 160 causes the entire pressure of hydraulic fluid from the brake cylinder to act upon the upper face 119a of the valve spool, causing a rapid shift downward of the valve spool 113a.

Figure 7:
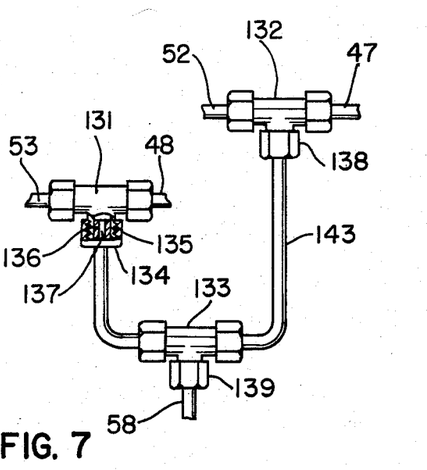
FIGURE 7 is a view, partially in section, of an alternative means for controlling the flow of hydraulic fluid to the brake mechanism.

Yet a further modification of means for supplying and controlling the flow of hydraulic fluid to the brake cylinder is shown in FIGURE 7. The system shown herein, while it does not have all of the features and flexibility of the valve bodies shown in FIGURES 4, 6 and 10, nonetheless it may be advantageous for its simplicity of design and the inexpensive manner in which it may be constructed. In this drawing, conduits 47 and 48 are hydraulic lines that communicate with the valve body 46 as shown in FIGURE 3. Conduits 52 and 53 communicate with the motor M and conduit 58 communicates with the brake cylinder, also illustrated in FIGURE 3. In the embodiment shown in FIGURE 7, pipe "T's" 131 and 132 are interposed as a hydraulic connection between hydraulic lines 53 and 48 and hydraulic lines 42 and 47 respectively. Accordingly, when the motor M is in operation, high pressure hydraulic fluid will necessarily flow either through pipe T 131 or pipe T 132.

Pipe T 131 is provided with a nipple 134 that secures conduit 142 in hydraulic sealing relationship with the interior of the pipe T. Similarly, nipple 138 connects hydraulic conduit 143 to pipe T 132. Both conduits 142 and 143 are in communication with a pipe T 133. Pipe T 133, in turn, hydraulically communicates with brake cylinder conduit 58 via a nipple connection 139.

As illustrated with respect to pipe T 131, the nipple connection 134 is attached to the T by means of pipe threads 135. Within this leg of the T, a block 136 is inserted, as by a press fit. The block 136 contains a drilled passageway 137 that communicates between the interior of the pipe T 131 and the hydraulic conduit 142. Pipe T 132 also is provided with a similar block and a drilled passageway.

The purpose of the block 136 and its drilled passageway 137 is to provide a pressure drop with respect to the hydraulic fluid that passes therethrough. Due to the pressure drop imposed by these blocks in pipe T's 131 and 132, hydraulic pressure will be maintained within pipe T 133 at all times that high pressure hydraulic fluid is being supplied to the motor M via either conduit 47 or 48. It can be appreciated that the pressure within pipe T 133 will be significantly less than the hydraulic pressure in conduits 47 or 48, and when the diameter of the drilled passageways 137 are equal, the pressure within the pipe T 133 will be one-half of line pressure. Thus, since the full hydraulic pressure will not be available to actuate hydraulic piston 61, the design of the piston, the bias of the spring 62, and the mechanical advantage of the linkage to the brake bands 66 must be adjusted to be operable at these reduced pressures.

It can readily be understood that the reduced passageways 137 in blocks 136 essentially are functional equivalents and substitutes for the various ball checks shown in certain of the other drawings. Therefore, if desired, check valves 19 and 21 of FIGURE 2, ball checks 74 and 84 of FIGURE 4, and ball checks 72a and 82a of FIGURE 6 may, if desired, be replaced by a pressure reducing device such as a fixed orifice or a throttle valve, and such substitution is intended to fall within the scope of this invention. However, as noted with respect to FIGURE 7, if pressure reducing devices are used to substitute for the check valves, the design of the brake operating mechanism must be adapted to operate at these reduced pressures.

Figure 12:
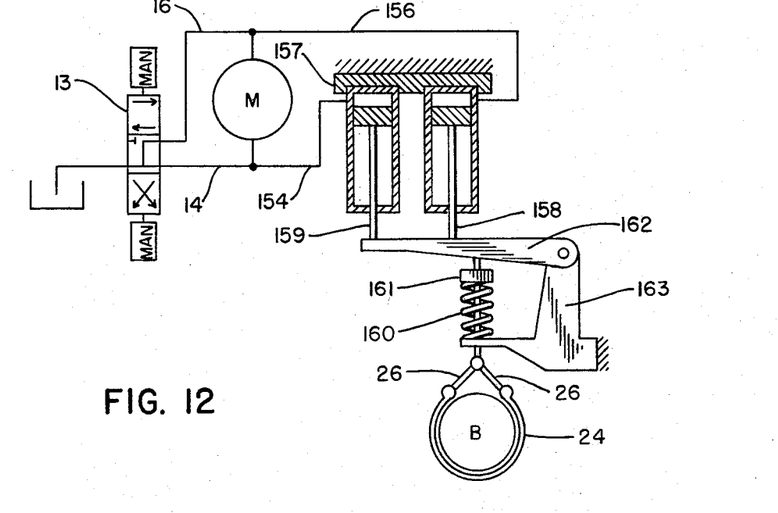
FIGURE 12 is a schematic representation showing an alternative means for controlling the hydraulic brake mechanism of this invention.

Still a further modification of this invention is illustrated in FIGURE 12. In this particular design, no check valves or reducing orifices are required. Instead, if the spool valve 13 is positioned to introduce hydraulic fluid into hydraulic line 16, the hydraulic fluid, in addition to driving the motor M, will enter hydraulic conduit 156, cylinder block 157, and cause piston 158 to exert a force downwardly against lever 162. Lever 162 is pivotally attached to the support 163.

The action of the brake band is controlled, as discussed with referenuce to other drawings, by the operating linkages 26 that are in turn controlled by the movement of the connecting rod 28. The connecting rod 28 extends upwardly to and seats against the lever arm 162. The connecting rod 28 is biased to remain in the upward position due to the action of compression spring 160 and spring stop and adjustment means 161. Thus, if there is no hydraulic pressure in either lines 154 or 156, no force will be exerted upon lever arm 162 by either pistons 158 or 159, and the connecting rod 28 will be in its most upward position, thus permitting the brake B to set. However, when high pressure oil is furnished to the motor M, either hydraulic line 154 or 156 will carry high pressure hydraulic fluid to piston block 157 and cause either pistons 158 or 159 to move downwardly against the lever arm 162 which will move connecting rod 28 downwardly against the force of compression spring 160 and cause the brake band to be released. When the spool valve is returned to its mid position, the hydraulic pressure will be relieved in the piston block 157, and the connecting rod 28 will be forced upward by the action of the spring 160 and the brake will be set.

Figure 11:
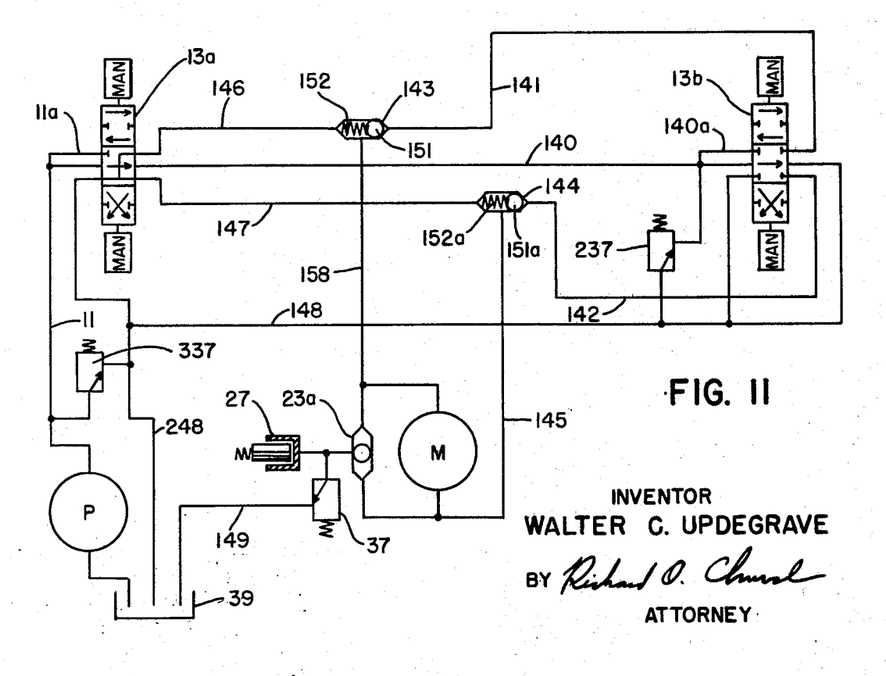
FIGURE 11 is a schematic representation of this invention illustrating control features useful in conjunction with dual control stations.

FIGURE 11 is a schematic representation of a hydraulic system constructed according to this invention having dual control stations. The control valve 13a represents the control mounted at ground level at or near the base of the boom, and capable of being operated by a person in or near the truck. The control valve 13b represents a control station mounted in the bucket at the upper extremity of the boom. With the control valves 13a and 13b in the centered or neutral positions, the high pressure hydraulic line 11 is in communication via the valve 13a with the conduit 140 which similarly communicates with the conduit 148 and 248 to the sump 39. The hydraulic line 11a provides hydraulic communication between the line 11 and the operative orifice of the control valve 13a. The motor conduit 146 provides hydraulic communication between the exit orifice of the lower control valve 13a and the motor M by way of the spring biased shuttle valve 143 and the conduit 158 as similar function is served by the motor conduit 147 which communicates between the second operative orifice of the lower control valve 13a and the motor M by way of the spring biased shuttle valve 144 and the motor conduit 145. Communication between the operative orifices of the upper control valve 13b and the motor M are provided by the motor conduits 141 and 158 via the spring biased shuttle valve 143, and by the motor conduits 142 and 145 via the spring biased shuttle valve 144. The hydraulic line 148 provides communication between the upper control valve and the sump 39 by way of the hydraulic line 248. The relief valves 237 and 337 are provided to permit dumping of high pressure hydraulic fluid from the hydraulic lines 140 and 11 respectively to the low pressure hydraulic lines 148 and 248 respectively which communicate directly to the sump. It will be noted that the motor and brake control mechanism illustrated in this schematic drawing are only representative of the several embodiments of this invention heretofore described, and any of the brake control systems described herein would function equally well in the dual control system here under discussion.

In operation of this system, when the lower control valve 13a is shifted downward, high pressure hydraulic fluid will flow through the valve body into the motor conduit 146 and through the spring biased shuttle valve 143 into the conduit 158 and to the motor M. Since the ball 151 of the shuttle valve 143 will be seated to the right, hydraulic fluid will be prevented from entering the motor conduit 141. Similarly, exhaust hydraulic fluid will flow from the motor M through the motor conduit 145 into the motor conduit 147, and, since the ball valve 144 is spring biased to the right, hydraulic fluid will not flow into the motor conduit 142. From the motor conduit 147, the exhaust hydraulic fluid communicates with the sump 39 via the control valve 13a and the hydraulic line 248.

It can be understood that if there were no provision for the shuttle valves 143 and 144 to isolate the two systems, operation of the slewing mechanism from the lower control valve 13a would become impossible under some circumstances. For instance, if the upper control valve 13b were jammed in its upper, or crossed, position, as by physical injury to a worker in the bucket, and it were attempted to control the slewing mechanism from the lower control valve 13a by directing high pressure hydraulic fluid into the conduit 146, if there were no shuttle valve 143, the fluid would directly enter the motor conduit 141 and upon passing through the control valve 13b, would be returned to the hydraulic line 148 and to the sump, thus making it impossible to operate the slewing mechanism in the desired direction. Thus, it is necessary that the valves 143 and 144 be spring biased to the right to permit control of the slewing mechanism at all times from the lower control station. The effect of the spring biased valves 143 and 144 is to permit operation of the slewing mechanism from the lower control station at all times, regardless of the position of the upper control valve 13b. In addition, this design of the valves 143 and 144 permits hydraulic communication between the motor conduits 145 and 158 and the low pressure return line 248 to permit the relief of pressure in the brake cylinder 27 and the resultant setting of the brake.

Although certain embodiments of the invention have been shown in the drawings and described in the specification, it is to be understood that the invention is not limited thereto, is capable of modification, and can be rearranged without departing from the spirit and scope of the invention.

I claim:
1. A slewing mechanism for cranes comprising:
  (A) a boom mounted for rotation about a normally vertical axis;
  (B) a hydraulic drive system comprising:
    (1) a rotary hydraulic motor;
    (2) a source of high pressure hydraulic fluid;
    (3) at least two hydraulic lines connecting said motor;
    (4) valve means to control the flow and direction of flow of high pressure hydraulic fluid in said line;
  (C) a gear train for transmitting the rotational output of said motor to said boom, which gear train has an efficiency at rest of more than 50%;
  (D) brake means operative to secure said boom and restrict its rotation, said brake means being responsive to the hydraulic pressure in said hydraulic lines whereby said brake means will secure said boom when the hydraulic pressure is low in both of said hydraulic lines and will release said boom when the hydraulic pressure is high in either of said hydraulic lines;
  (E) a valve body comprising:
    (1) a first and a second orifice, said first orifice being in hydraulic communication with one of said hydraulic lines and said second orifice being in communication with the other of said hydraulic lines;
    (2) a first passageway;
    (3) a first and a second check valve enabling hydraulic fluid to flow from said first and said second orifices respectively, into but not out of said first passageway;
    (4) a second passageway communicating with:
      (a) said first passageway via a first received opening;
      (b) a third orifice; and
      (c) a third passageway via a second restricted opening;
    (5) said third orifice providing hydraulic communication with said brake means;
    (6) said third passageway having a fourth orifice, said fourth orifice being in hydraulic communication with a point of low pressure within said hydraulic drive system.

2. A valve body according to claim 1 in which at least one of said first and said second restricted openings are adjustable.

3. A valve body according to claim 2 in which said first passageway communicates via a spring biased third check valve with said third passageway, said check valve being adapted to permit the flow of hydraulic fluid out of said first passageway and into said third passageway.

4. A valve body according to claim 3 in which said spring biased third check valve is adjustable.

5. A slewing mechanism for cranes comprising:
  (A) a boom mounted for rotation about a normally vertical axis;
  (B) a hydraulic drive system comprising:
    (1) a rotary hydraulic motor;

(2) a source of high pressure hydraulic fluid;
(3) at least two hydraulic lines connecting said source to said motor;
(4) valve means to control the flow and direction of flow of high pressure hydraulic fluid in said lines;

(C) a gear train for transmitting the rotational output of said motor to said boom, which gear train has an efficiency at rest of more than 50%;

(D) brake means operative to secure said boom and restrict its rotation, said brake means being responsive to the hydraulic pressure in said hydraulic lines whereby said brake means will secure said boom when the hydraulic pressure is low in both of said hydraulic lines and will release said boom when the hydraulic-pressure is high in either of said hydraulic lines;

(E) a valve body comprising:
(1) a first and a second orifice, said first orifice being in hydraulic communication with one of said hydraulic lines and said second orifice being in communication with the other of said hydraulic lines;
(2) a first passageway;
(3) a first and a second check valve enabling hydraulic fluid to flow from said first and said second orifices respectively into but not out of said first passageway;
(4) said first passageway communicating to the underside of a valve spool;
(5) said valve spool having:
(a) an axial passageway; and
(b) a truncated upper portion;
(6) a valve seat adapted to receive said truncated portion of said valve spool in hydraulic sealing relationship thereto;
(7) resilient means biasing said valve spool to a position away from said valve seat;
(8) second passageway communicating from the upper truncated portion of said valve spool to a third orifice;
(9) said third orifice providing hydraulic communication with said brake means;
(10) a third passageway communicating to a fourth orifice, said fourth orifice being in communication with a point of low pressure within said hydraulic system; and
(11) a generally radially extending fifth passageway communicating between the axial passageway in said valve spool and said third passageway when said valve spool is engaged with said valve seat.

6. A valve body according to claim 5 in which said valve body includes a spring biased check valve, said check valve adapted to permit hydraulic fluid in said first passageway means to flow into a sixth passageway, said sixth passageway in communication with a radially extending seventh passageway that communicates between the axial passageway in said valve spool and said sixth passageway when said valve spool is engaged with said valve seat.

7. A slewing mechanism according to claim 5 in which a ball check valve is positioned within the axial passageway of the valve spool to permit the flow of hydraulic fluid toward but not away from the brake means.

8. A slewing mechanism for mobile cranes comprising:
(A) a boom mounted for rotation about a normally vertical but sometimes inclined axis;
(B) a hydraulic drive system comprising:
(1) a rotary hydraulic motor;
(2) a source of high pressure hydraulic fluid;
(3) first and second hydraulic motor lines; and
(4) valve means interposed between the source of hydraulic fluid and the first and second motor lines which valve means are adapted to control the pressure and direction of flow of hydraulic fluid in the motor lines;

(C) a gear train for transmitting the rotational output of the motor to the boom, which gear train has an efficiency at rest of more than 50%;

(D) modulating brake means effective to restrict to a controllable and variable degree the rotation of the gear train including:
(1) a friction brake;
(2) resilient means biased to urge the friction brake into gear train securing position;
(3) means to sense the hydraulic pressure in the first and second motor lines; and
(4) hydraulic brake release means including first and second hydraulic brake lines communicating between the first and second motor lines respectively and the brake release means, which release means are responsive to the higher of the pressures sensed in the first and second motor lines wherein the greater the pressure sensed, the greater will be the action of the brake release means to oppose and overcome the bias of the resilient means.

9. A slewing mechanism for cranes according to claim 8 in which restricted hydraulic pressure reducing means are included within each of the first and second brake lines.

10. A slewing mechanism for cranes according to claim 9 in which one-way valves are connected in parallel with each of the pressure reducing means to permit the free passage of hydraulic fluid toward but not away from the brake releasing means.

11. A slewing mechanism for cranes according to claim 8 in which the first and second brake lines terminate at opposite seats of a shuttle valve having an unrestricted orifice and the unrestricted orifice of the shuttle valve is in hydraulic communication with the brake releasing means.

12. A slewing mechanism for cranes according to claim 8 in which the brake releasing means is comprised of two hydraulic pistons hydraulically connected to the first and second brake lines respectively and mechanically connected to the brake means whereby the brake will be relieved against the bias when either the first or second brake lines are subjected to hydraulic fluid under pressure.

13. A slewing mechanism for cranes according to claim 8 in which check valves are included in each of the brake lines to permit fluid to flow from the motor lines to the brake means but not from the brake means to the motor lines.

14. A slewing mechanism for cranes according to claim 13 in which a sump return conduit communicates between the brake means and a point of low hydraulic pressure.

15. A slewing mechanism for cranes according to claim 14 in which a restricted orifice is located in the sump return conduit and the brake means is a hydraulic piston.

16. A slewing mechanism according to claim 8 in which there are two valve means adapted to control the flow of high pressure fluid in the motor lines, one valve means being located adjacent the lower end of the boom and the second valve means being located adjacent the upper end of the boom.

17. A slewing mechanism according to claim 16 in which there is hydraulic communication between the two valve means, which communication may, when required, be severed to isolate the two valve means.

18. A slewing mechanism according to claim 17 including third and fourth hydraulic motor lines communicating between the first valve means and the first and second motor lines respectively, and fifth and sixth hydraulic motor lines communicating between the second valve means and the first and second motor lines respectively;
a first and second spring shuttle valve;
the third and fifth motor lines terminating at opposite seats of the first shuttle valve and the first motor line communicaing with the unrestricted orifice of the second shuttle valve;

the first shuttle valve spring biased to seat against the fifth motor line and the second shuttle valve spring biased to seat against the sixth motor line.

References Cited

UNITED STATES PATENTS

| 3,154,199 | 10/1964 | Balogh | 212—35 |
| 3,249,336 | 5/1966 | Brown | 254—150 |
| 3,253,683 | 5/1966 | Stein | 192—3 |
| 3,279,621 | 10/1966 | Hackenberger | 212—35 |
| 3,291,451 | 12/1966 | Trollope | 254—185 |
| 3,314,657 | 4/1967 | Prud'Homme | 254—189 |
| 3,034,670 | 5/1962 | Lafian | 214—138 |

HARVEY C. HORNSBY, Primary Examiner

U.S. Cl. X.R.

91—41; 192—3

UNITED STATES PATENT OFFICE
CERTIFICATE OF CORRECTION

Patent No. 3,499,543      Dated March 10, 1970

Inventor(s) Walter C. Updegrave

It is certified that error appears in the above-identified patent and that said Letters Patent are hereby corrected as shown below:

Column 11, line 69:    Insert -as- before "illustrated".

Column 12, line 57:    "referenuce" should read -reference-.

Column 14, line 50:    "received" should read -restricted-.

Column 15, line 16:    "hydraulic-pressure" should read -hydraulic pressure-.

SIGNED AND SEALED

FEB 23 1971

(SEAL)
Attest:

Edward M. Fletcher, Jr.
Attesting Officer

WILLIAM E. SCHUYLER, JR.
Commissioner of Patents